United States Patent
Radermacher

(10) Patent No.: US 8,773,034 B2
(45) Date of Patent: Jul. 8, 2014

(54) POWER SUPPLY SYSTEM FOR ELECTRONIC LOADS

(75) Inventor: Harald Josef Gunther Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 197 days.

(21) Appl. No.: 13/391,035

(22) PCT Filed: Aug. 25, 2010

(86) PCT No.: PCT/IB2010/053810
§ 371 (c)(1), (2), (4) Date: Feb. 17, 2012

(87) PCT Pub. No.: WO2011/027261
PCT Pub. Date: Mar. 10, 2011

(65) Prior Publication Data
US 2012/0146549 A1 Jun. 14, 2012

(30) Foreign Application Priority Data
Sep. 1, 2009 (EP) ..................................... 09169112

(51) Int. Cl.
*H05B 41/16* (2006.01)
(52) U.S. Cl.
USPC ............................. 315/246; 315/272; 315/291
(58) Field of Classification Search
USPC ............. 315/200 R, 205, 207, 246, 272, 291, 315/294, 352
See application file for complete search history.

(56) References Cited

U.S. PATENT DOCUMENTS

| | | | | |
|---|---|---|---|---|
| 7,061,212 B2* | 6/2006 | Phadke | ......................... | 323/222 |
| 8,022,641 B2* | 9/2011 | Janik et al. | .................... | 315/297 |
| 2002/0141211 A1 | 10/2002 | Malik et al. | | |
| 2008/0013324 A1* | 1/2008 | Yu | ................................. | 362/311 |

FOREIGN PATENT DOCUMENTS

EP    0531995 A2    3/1993

* cited by examiner

*Primary Examiner* — Tung X Le
(74) *Attorney, Agent, or Firm* — Yuliya Mathis

(57) ABSTRACT

The invention relates to a power supply system and a method for providing a load (L) with electrical power from either a first or a second AC grid source (10L, 10H) that supply different first and second AC voltages, respectively. In a particular example, said grid sources may belong to the US and the European mains, respectively, and the load may be a lamp with mains compatible LEDs (Ch1-Ch4). The power supply system comprises a first and a second connector device (30L, 30H) for connecting a converter circuit (20) to the first or the second AC grid source (10L, 10H), respectively. Moreover, the second connector device (30H) comprises a transformation circuit (D1-D4) for transforming the second AC voltage such that it yields a similar output voltage of the converter circuit (20) as the first AC voltage. In a particular example, the converter circuit (20) may comprise a rectifier (D5-D8, C1, C2) with voltage doubling function, and the second connector device (30H) may comprise a rectifier (D1-D4) while the first connector device (30L) is a simple cable.

15 Claims, 2 Drawing Sheets

POWER SUPPLY SYSTEM FOR ELECTRONIC LOADS

FIELD OF THE INVENTION

The invention relates to a power supply system and a method for providing a load with electrical power from different AC grid sources. Moreover, it relates to a luminaire comprising such a power supply system.

BACKGROUND OF THE INVENTION

Most electric or electronic devices are operated with electrical power taken from the public electricity grid (shortly called "grid" or "mains" in the following). As the grids of different countries provide different AC voltages, for example about 115 V in the USA and about 230 V in Europe, provisions have to be taken that allow the adaptation of a device to such different voltage supplies. From the EP-0531995 A2, a circuit is for example known in which the user has to close or open a switch depending on the grid the associated apparatus shall be connected to. This is not convenient but prone to erroneous operation.

SUMMARY OF THE INVENTION

Based on this background it was an object of the present invention to provide alternative means for adapting an electrical or electronic load to the voltages provided by different grids. Preferably, the solution should work without requiring bulky components or resulting in high additional losses.

This object is achieved by a power supply system according to claim 1, a method according to claim 2, and a luminaire according to claim 3. Preferred embodiments are disclosed in the dependent claims.

According to a first aspect, the invention relates to a power supply system for providing a (electric or electronic) load with electrical power from either a first AC grid source or a second AC grid source that supply different first and second AC voltages, respectively. The power supply system comprises the following components:

a) A circuit that is called "converter circuit" in the following for reasons of unique reference (but without any limitation with respect to its function). The converter circuit is intended to provide an output voltage to the load that is in a suitable range for operating it.

b) A first connector device for providing a first input voltage to the converter circuit when the first connector device is connected to the first AC grid source.

c) A second connector device for providing a second input voltage to the converter circuit when the second connector device is connected to the second AC grid source (as an alternative to connecting the converter circuit to the first AC grid source via the first connector device). The second input voltage shall be different (in amplitude and/or waveform) from the first input voltage that is provided to the converter circuit by the first connector device; it may e.g. be a DC voltage while the first input voltage is an AC voltage, or it may have another amplitude. Moreover, the second connector device comprises a "transformation circuit" for transforming the second AC voltage in such a way that it yields a similar output voltage of the converter circuit as the first AC voltage. The "similarity" of the output voltages is defined in this context with respect to the requirements of the load at hand, i.e. all output voltages that are valid for operating the load are considered as being similar. Typically, similar output voltages differ by less than ±30%, preferably less than ±15% from a given reference value.

It should be noted that also the first connector device may comprise some circuitry for transforming the first AC voltage. The above reference to a "transformation circuit" in the second connector thus mainly refers to those electronic components in the second connector device that cause the difference in the combined behavior of connector devices and converter circuit. As a result, the difference in output voltage generated by the converter circuit is by far lower than the difference in AC supply voltage.

The aforementioned output voltage that is provided to the load by the converter circuit may particularly correspond in amplitude to one of the AC grid voltages (for example the higher one). Moreover, the first input voltage that is provided by the first connector device may optionally correspond to the first AC grid source, i.e. the first connector device may simply forward this voltage without (substantial) transformation.

It should further be noted that, when voltages are compared, equal definitions have to be applied. In the most general case, the complete waveforms of voltages are compared, i.e. their amplitude, phase, spectral composition (frequency in case of sinusoidal voltages) etc. are taken as a base of the comparison. In many practical cases, the comparison will be limited to the amplitudes of the voltages. Particularly in case of AC voltages, either effective voltages or peak voltages can be compared. If not stated differently, effective voltages will be referred to in the context of the present application.

According to a second aspect, the invention relates to a method for providing a load with power from either a first or a second AC grid source that supply different first and second AC voltages, respectively, said method comprising the following steps:

a) Connecting a converter circuit either with a first connector device to the first AC grid source or with a second connector device to the second AC grid source, wherein the first connector device provides a first input voltage to the converter circuit and the second connector device provides a second input voltage to the converter circuit that is different from said first input voltage, and wherein the converter circuit provides an output voltage to the load.

b) Transforming the second AC voltage in the second connector device such that it yields a similar output voltage of the converter circuit as the first AC voltage, wherein this step is done in case the converter circuit is connected with the second connector device to the second AC grid source.

The method comprises in general the steps that can be executed with a power supply system according to the first aspect of the invention. Reference is therefore made to the above description of said system for more information on the details and definitions regarding the method.

According to a third aspect, the invention comprises a luminaire having the following components:

a) A lamp, which may comprise any suitable light source. In particular, it may comprise at least one light emitting diode (LED), most preferably a mains compatible light emitting diode (MCLED) that is designed to be operated with a DC voltage of about 200-300 V.

b) A power supply system according to the first aspect of the invention for providing the lamp as a load with power.

The luminaire is a particularly important example of a combination comprising a load and a power supply system according to the invention.

The power supply system, the method, and the luminaire according to the first, second and third aspect of the invention, respectively, have in common that they apply (at least) two different connector devices for connecting a converter circuit to different mains. One of these connector devices comprises a transformation circuit that, in combination with the converter circuit, transforms the (second) AC voltage such that it yields a similar output voltage for operating the load as the first connector device in combination with the converter circuit. Hence all that has to be done for adapting the power supply to different AC grid sources is to use the appropriate connector device for connecting the converter circuit to said grid source. This is however no additional complication because different connector devices will typically have to be applied anyway due to incompatible connector standards of different grid systems. Selecting the appropriate connector will hence at the same time guarantee a proper adaptation of voltages. No additional change of switches is necessary, thus increasing both the comfort and the safety (as such switching cannot be forgotten). At the same time, the connector devices can be kept comparatively simple because a part of the voltage conversion is done by the converter circuit. An intelligent task sharing thus helps to minimize hardware and cost efforts for the different connector devices.

In the following, various preferred embodiments of the invention will be described that relate to a power supply system, a method and/or a luminaire of the kind described above.

The connector devices may in general have an arbitrary design. They may particularly be designed such that they can reversibly be connected to the converter circuit, which can hence readily be coupled by a user to a connector device that is appropriate for the AC voltage grid at hand.

In a preferred embodiment, the first connector device and/or the second connector device will comprise a cable, i.e. a flexible line with at least two leads for guiding voltages from a grid source to the load.

According to another embodiment, the first connector device and/or the second connector device comprises a plug that is compatible to a socket of the first or the second AC grid source, respectively. For various reasons, different voltage grids will usually apply different standards of the associated plug-and-socket connectors, i.e. the sockets of the first and second AC grid are typically different from each other (incompatible). Providing the first and the second connector device with plugs that are compatible to the voltage grid each connector device is intended for then guarantees that only the proper connector device can be used. Moreover, the need to provide each product with mains-specific cables can hence be combined with an implicit electrical adaptation of the power supply to the respective voltage grid.

The transformation circuit of the second connector device may preferably be integrated into a plug or into an inline switch. The integration is particularly possible in the aforementioned cases in which the connector devices comprise a cable and/or mains-specific plugs.

The first AC voltage is preferably lower than the second AC voltage. The transformation circuit in the second connector device will then modify the AC voltage in a way that the converter output voltage is similar to the converter output voltage with the first AC voltage.

As already mentioned, the first AC voltage may be in the range of 90-130 V, preferably having a value about 115 V, corresponding to the grid voltage in the USA. The second AC voltage may be in the range of 200-260 V, preferably having a value about 230 V, corresponding to the grid voltage in European countries.

There are various possibilities to realize the functionality of the power supply system. According to one embodiment, the converter circuit comprises an AC-DC converter. Most preferably, said AC-DC converter provides the output voltages of the converter circuit, meaning that loads can be operated which require DC voltage. Typical examples of such loads are arrangements of serial or parallel connected LED junctions, resulting in an operation voltage of 200-300V and a current consumption of 5-100 mA. For professional application, a wider current range, i.e. higher current level can be expected. How the connection of the LED junctions is realized (i.e. on chip level, by hybrid integration, on board level) is not important for the application of the invention. In addition, other supply voltage ranges are possible. E.g. solid state light source which have to be powered from a 12V or a 24V AC supply could use the same idea.

According to a further development of the aforementioned embodiment, the AC-DC converter of the converter circuit has the capability of a voltage multiplying function, preferably a voltage doubling function. This means that the (DC) output voltage is a multiple of the AC input voltage. The voltage multiplying function can for example be realized by circuits comprising diodes and capacitors as known to a person skilled in the art.

The converter circuit may particularly comprise a rectifier and a first capacitance, which is connected between a first output and a first input of said rectifier, and a second capacitance, which is connected between said first input and the second output of the rectifier. As will be explained with reference to the Figures, such a circuit realizes an AC-DC converter with voltage doubling function.

Manipulating a voltage level may be realized in different ways, for example by a resistor that drops the input voltage by dissipating it into heat, or by a transformer. To avoid the energy losses of such solutions and/or to avoid bulky components like transformers or complicated switch mode power supplies, the transformation circuit may preferably be realized by polarity-dependent switches, e.g. diodes and/or transistors.

Most preferably, the transformation circuit of the second connector device comprises a rectifier. An AC voltage at the input of the second connector device, which repetitively changes polarity, is hence transformed into a pulsating DC voltage at the output of said connector device with a constant polarity. The rectifier may particularly comprise a diode bridge.

The first connector device and the second connector device are preferably designed such that they can reversibly be connected to the converter circuit. By connecting the appropriate connector device to the converter circuit, a user can then adapt the system to an AC voltage grid at hand. Coupling of the connector devices to the converter circuit is preferably done via a non-standard interface, for example a specific plug-and-socket system. This prevents that (i) a second connector device is erroneously connected to another apparatus and (ii) that a standard cable is used with the converter circuit. Both situations might yield undesirable results.

According to another embodiment of the invention, the first connector device and the second connector device are combined in one unit having different terminals for connection to the first and second AC grid sources and/or to the converter circuit. This embodiment is particularly suited for professional applications like the fixed installation of suspended lights.

BRIEF DESCRIPTION OF THE DRAWINGS

These and other aspects of the invention will be apparent from and elucidated with reference to the embodiment(s)

described hereinafter. These embodiments will be described by way of example with the help of the accompanying drawings in which.

Like reference numbers in the Figures refer to identical or similar components.

DESCRIPTION OF PREFERRED EMBODIMENTS

Figure 1:
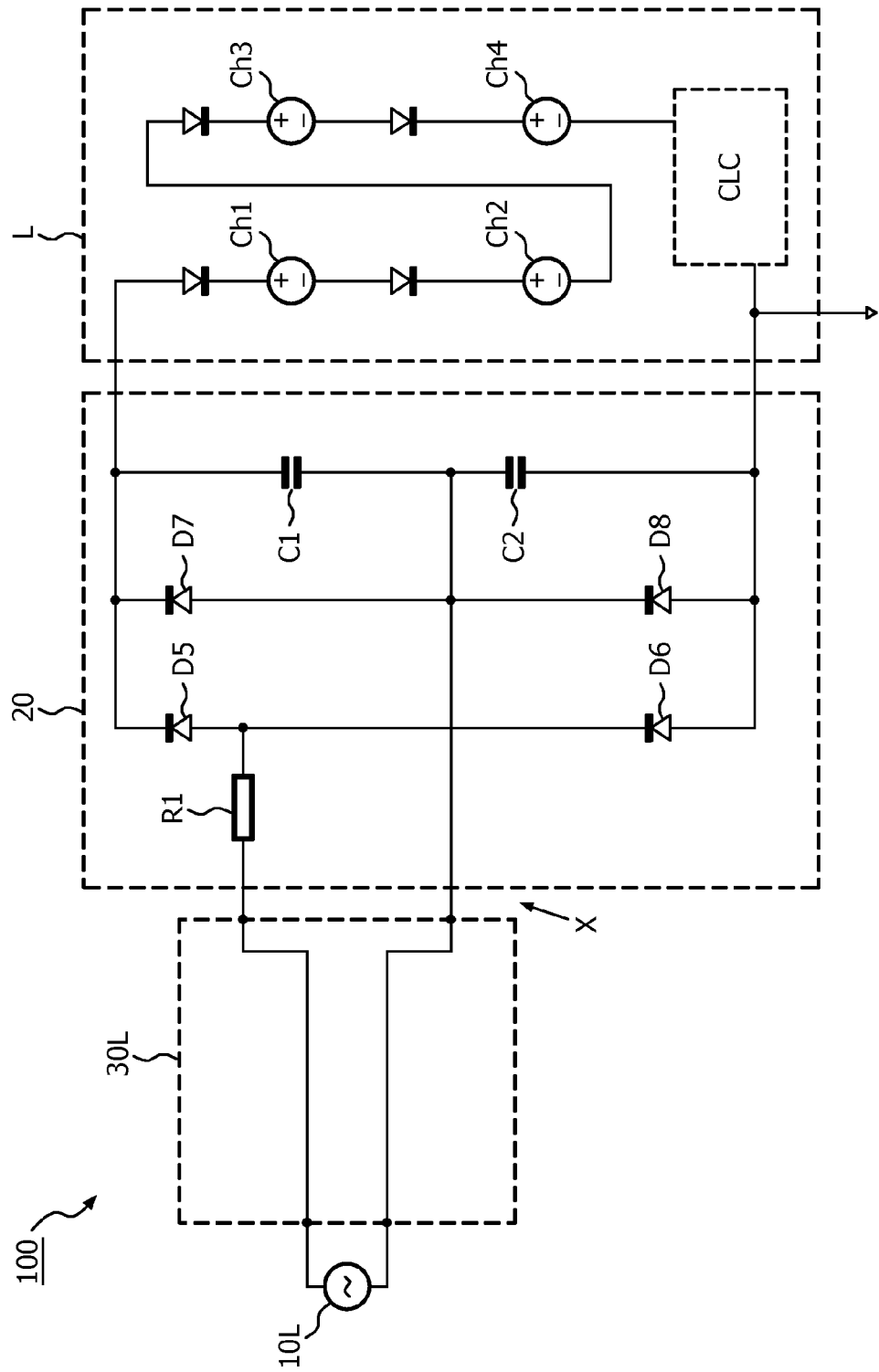
FIG. 1 illustrates an LED luminaire with a power supply system using a first connector device for coupling it to a first AC grid voltage.

The power supply system and the method according to the invention will in the following be explained with reference to a luminaire, though its application is not limited to this case. Instead, the principles and the circuits can be applied with other loads that shall be operated with different grid voltages, too. In particular, the invention can be applied for loads requiring a DC power supply that shall be operated with AC voltages from the US and European grid, respectively.

For luminaires for the customer market, there is the wish to have one product design that can be used world-wide. This requirement includes the need to be independent from different mains voltage values (e.g. 115 V in the US and 230 V in Europe). On the other hand, LEDs are becoming a standard, non-replaceable component which will be used in a variety of luminaires due to their long lifetime. Due one addressed market, the consumer market, it is desired to have a system which does not require user interaction (like setting a switch to the correct position). When applying the invention for professional luminaires, the functionality could be based on connection the supply voltage to one or the other terminal with the luminaire connection box.

When using mains compatible LEDs (MCLED), usually there is no driver that would be able to produce a stable output voltage from any input voltage. So, this would typically require dedicated 115 V MCLEDs for products which will be sold in the US, and 230 V MCLEDs for European products.

One thing that will be different between an US and an European luminaire is the power cord because different socket types are used in the different countries. Hence, it is proposed here to have some (very small) components which are integrated into the power cord and serve for the voltage adaptation while the rest of the luminaire (including the LED lamp) remains the same. In the following, a simple structure of a voltage doubler topology in a luminaire combined with a rectifier integrated in the power cord is described which will enable luminaires where only the mains cord determines the input voltage range.

In an exemplary embodiment, the "US power cord" may be a normal power cord (without any components inside, or it may comprise a fuse as protection against wrong operation). Moreover, the 115 V from the US mains grid are rectified and doubled by a "converter circuit" in the luminaire, resulting in a supply voltage suitable for a 230 V MCLED.

The corresponding "European power cord" of the aforementioned luminaire may include a bridge rectifier, for example realized as a tiny component than can be integrated into the plastic part of the plug. This results in delivering only a single polarity to the luminaire. The voltage doubler inside the lamp cannot double this unipolar voltage. As a result, the rectified supply voltage is once again suitable for a 230 V MCLED.

An alternative solution might be to have different internal connections inside the luminaire or a separate unit and connect the (in either case normal) power cord either to the bridge rectification input (for Europe) or to the voltage doubler input (for US).

FIG. 1 shows schematically a luminaire 100 with a power supply system according to the above concepts. The luminaire 100 is connected to an AC grid voltage source 10L, in this example corresponding to the 115 V mains used in the USA. The grid voltage may for example be provided via a wall socket designed according to the standards uses in the respective country.

The luminaire 100 comprises the following components:

a) A converter circuit 20 providing an output voltage to a load L.

b) A "first connector device" 30L for connecting the converter circuit 20 to the grid voltage source 10L and for providing it with a first input voltage. In the shown example, the first connector device 30L is a simple usual 115 V power cord for connecting the terminals of the mains 10L to the inputs of the converter circuit 20, i.e. the first input voltage at the connector outputs (X) is (besides usual, negligible losses) identical to the first AC grid source of 115 V.

c) The load L that was already mentioned and that is here mainly realized by four MCLED chips Ch1-Ch4 connected in series. In this Figure, each MCLED is represented by a voltage source and a decoupling diode in series. Other numbers of chips are possible. Parallel strings are possible, too. The load L further comprises as optional components a current limiting circuit (CLC). In the simplest case, this may be a resistor.

Figure 2:
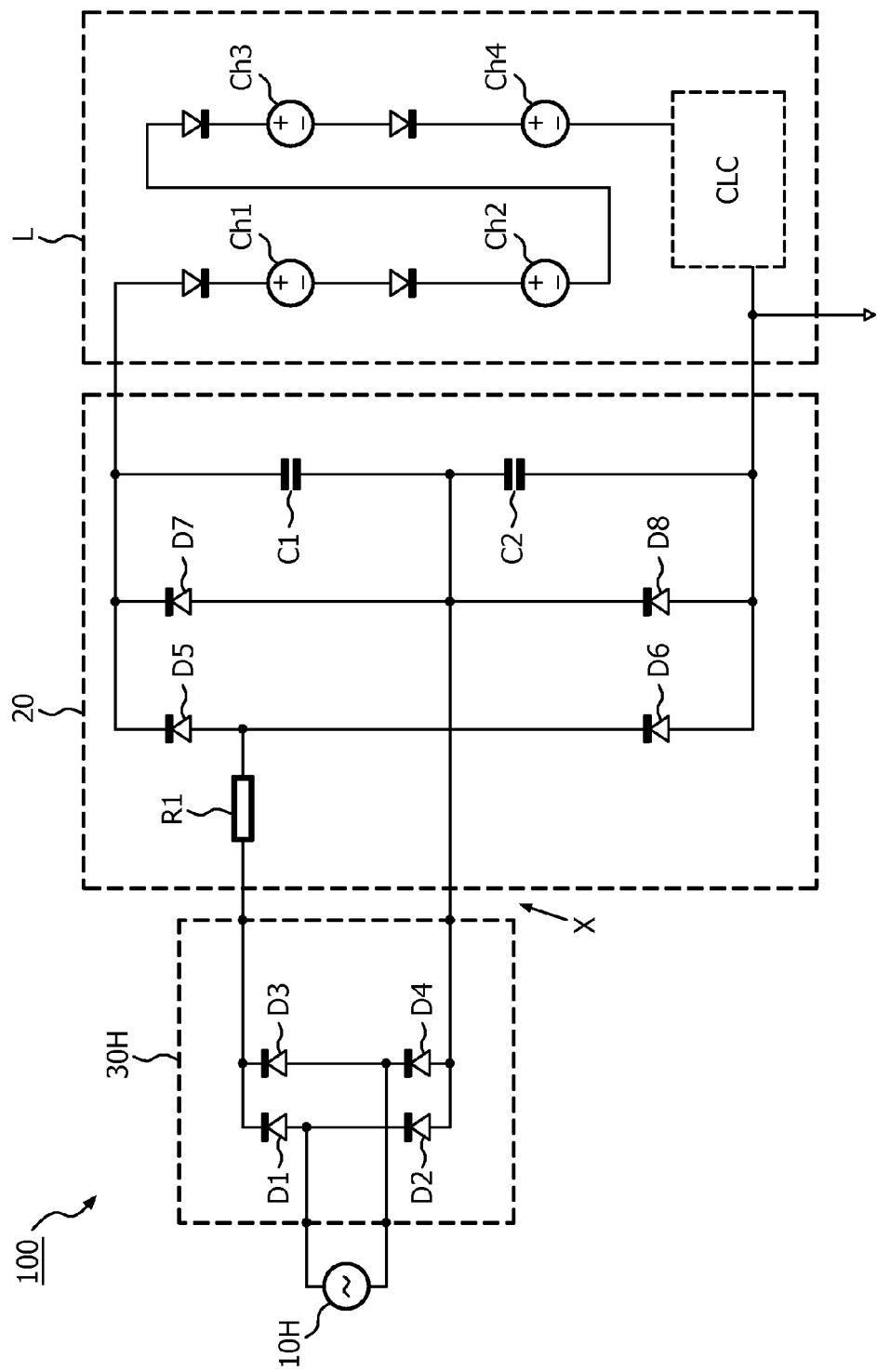
FIG. 2 shows the luminaire of FIG. 1 with a second connector device for coupling it to a second AC grid source.

FIG. 2 shows the luminaire 100 when operated by a second grid voltage corresponding to the 230 V mains of European countries. In contrast to FIG. 1, the converter circuit 20 is now connected with its inputs via a "second connector device" 30H to the 230 V grid source 10H. In addition to a plug (not shown) that is compatible with the standards of the mains, the second connector device 30H comprises a "transformation circuit", which is realized by a rectifier bridge comprising four diodes D1, D2, D3, and D4. It provides a second input voltage to the converter circuit 20 which is different from the above mentioned first input voltage that is provided by the first connector device 30L.

The first connector device 30L, the second connector device 30H, and the converter circuit 20 constitute a "power supply system" according to the invention. The functionality of this power supply system is as follows:

The converter circuit 20 has a tapped bus capacitor and a voltage doubling rectification. It comprises a rectifier that is constituted by the diodes D5 and D6, Positive input voltages charge an upper capacitor C1 via D5, which is connected between a first output and a first input of the aforementioned rectifier, (nearly) to the peak value of the input voltage. Negative input voltages charge a lower capacitor C2 via D6, which is connected between a second output and said first input of the rectifier, (nearly) to the peak of the input voltage. The total voltage across the outputs of the rectifier, i.e. across the four LEDs Ch1-Ch4 and the (optional) current limiting circuit (CLC) is then (nearly) twice the peak value of the bipolar input voltage.

When no negative voltage is supplied to the converter circuit 20, of course the lower capacitor C2 cannot be charged. If no positive voltage is present, the same holds for C1. In this unipolar mode, the diodes D7 and D8 protect the capacitors from excessive reverse voltage.

In FIG. 1, the luminaire 100 is equipped with a power cord 30L for US mains. This power cord 30L supplies a bipolar voltage of 115 V as the "first input voltage" to the converter circuit 20; the voltage doubler will be active to convert this voltage to approximately 300 V DC, which is then supplied to the LEDs Ch1-Ch4 via the current limiting elements.

In FIG. 2, the luminaire 100 is equipped with a power cord 30H for Europe. In this power cord 30H, the bridge rectifier D1-D4 is integrated (e.g. molded into the plastic plug or mounted into an in-line cord switch). The power cord hence delivers unipolar 230 V as the "second input voltage" to the converter circuit 20, which will inhibit voltage doubler operation. As a result the same approximately 300 V are produced and delivered to the LEDs. It is not required to supply the rectified 230 V with a specific polarity to the converter circuit 20. The voltage adaptation feature relies only fact of unipolar voltage itself, the polarity not being important.

During manufacturing, one only has to provide a product for a specific country with the right power cord (which has to be done anyway to provide the right, country-specific plug). This power cord 30L/30H may be a non-replaceable component which is firmly connected to the converter circuit 20. It is also possible to have an exchangeable power cord. Then, depending on the country of use, the right power cord has to be packed into the retail package. In this case, a non-standard interface X should be used between the power cord 30L/30H and the converter circuit 20 of the luminaire 100 to prevent usage of the rectifier-integrated power cord 30H for normal appliances which might be incompatible with this kind of voltage waveform and usage of the luminaries with a supply cord without the transformation circuit.

Instead of a power cord with a wall socket plug also a connection box with the integrated rectification can be used, e.g. for a suspended light which is used in a fixed installation. In this case the two connector devices 30L, 30H of FIGS. 1 and 2 would be combined into one unit or box, which might be separate from the converter circuit and the load L or integrated with them. Selection of the proper connector device for a specific AC grid would then be done by choosing the correct terminals of this unit for connection to the AC grid source and the converter circuit, respectively.

The resistor R1 may be used to limit the charging current of the system. Preferable R1 is a fusible resistor which also protects the system during abnormal operation.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A power supply system for providing a load with power from either a first AC grid source or a second AC grid source that supply different first and second AC voltages, respectively, comprising:
   a) a converter circuit for providing an output voltage to the load;
   b) a first connector device for providing a first input voltage to the converter circuit when the first connector device is connected to the first AC grid source;
   c) a second connector device for alternatively providing a second input voltage to the converter circuit when the second connector device is connected to the second AC grid source, wherein said second input voltage is different from the first input voltage, and wherein said second connector device comprises a transformation circuit for transforming the second AC voltage such that the second connector provides a similar output voltage of the converter circuit as the first AC voltage.

2. A luminaire comprising:
   a) a lamp;
   b) a power supply system according to claim 1 for providing the lamp with power.

3. The luminaire according to claim 2, wherein the lamp comprises a mains-compatible LED.

4. The power supply system according to claim 1, wherein the first and/or the second connector device comprises a cable.

5. The power supply system according to claim 1, wherein the first and/or the second connector device comprises a plug compatible to a socket of the first or the second AC grid source, respectively.

6. The power supply system according to claim 1, wherein the transformation circuit of the second connector device is at least partially integrated into a plug and/or an in-line switch.

7. The power supply system according to claim 1, the method wherein the first AC voltage is lower than the second AC voltage.

8. The power supply system according to claim 1, wherein the first AC voltage is in the range of 90-130 V and/or the second AC voltage is in the range of 200-260 V.

9. The power supply system according to claim 1, wherein the converter circuit comprises an AC-DC converter.

10. The power supply system according to claim 1, wherein the AC-DC converter has the capability of a voltage multiplying function.

11. The power supply system according to claim 1, or the luminaire,
   wherein the converter circuit comprises a rectifier and a first capacitance that is connected between a first output and a first input of said rectifier, and a second capacitance that is connected between said first input and a second output of said rectifier.

12. The power supply system according to claim 1, wherein the transformation circuit comprises a rectifier.

13. The power supply system according to claim 1, wherein the first connector device and the second connector device can reversibly be connected to the converter circuit.

14. The power supply system according to claim 1, wherein the first connector device and the second connector device are combined in one unit having different terminals for connection to the AC grid sources and/or to the converter circuit.

15. A method for providing a load with power from either a first AC grid source or a second AC grid source that supply different first and second AC voltages, respectively, comprising:
   connecting a converter circuit via either a first connector device to the first AC grid source or via a second connector device to the second AC grid source, wherein the first connector device provides a first input voltage to the converter circuit and the second connector device provides a second input voltage to the converter circuit that is different from said first input voltage, and wherein the converter circuit provides an output voltage to the load; and when the converter circuit is connected via the second connector device to the second AC grid source, transforming the second AC voltage with the second connector device such that the second connector provides a similar output voltage of the converter circuit as the first AC voltage.

* * * * *